US008684746B2

(12) United States Patent
Nickolai

(10) Patent No.: US 8,684,746 B2
(45) Date of Patent: Apr. 1, 2014

(54) COLLABORATIVE UNIVERSITY PLACEMENT EXAM

(75) Inventor: Daniel Nickolai, St. Louis, MO (US)

(73) Assignee: Saint Louis University, St. Louis, MO (US)

( * ) Notice: Subject to any disclaimer, the term of this patent is extended or adjusted under 35 U.S.C. 154(b) by 142 days.

(21) Appl. No.: 13/215,579

(22) Filed: Aug. 23, 2011

(65) Prior Publication Data
US 2012/0045744 A1 Feb. 23, 2012

Related U.S. Application Data

(60) Provisional application No. 61/376,035, filed on Aug. 23, 2010.

(51) Int. Cl.
*G09B 3/00* (2006.01)
(52) U.S. Cl.
USPC ........... 434/322; 434/118; 434/167; 434/187; 434/188; 434/323; 434/335; 434/336; 434/350; 434/362; 434/365; 434/430; 706/45; 706/46; 706/927
(58) Field of Classification Search
USPC ......... 434/118, 167, 187, 188, 322, 323, 335, 434/336, 350, 362, 365, 430; 706/45, 46, 706/927
See application file for complete search history.

(56) References Cited

U.S. PATENT DOCUMENTS

| | | | | |
|---|---|---|---|---|
| 6,419,496 | B1 * | 7/2002 | Vaughan, Jr. | 434/322 |
| 6,652,283 | B1 * | 11/2003 | Van Schaack et al. | 434/236 |
| 7,493,077 | B2 * | 2/2009 | Coleman et al. | 434/350 |
| 8,064,817 | B1 * | 11/2011 | Ziv-El | 434/319 |
| 2002/0160348 | A1 * | 10/2002 | Lin et al. | 434/322 |
| 2003/0017442 | A1 * | 1/2003 | Tudor et al. | 434/322 |
| 2003/0129574 | A1 * | 7/2003 | Ferriol et al. | 434/362 |
| 2004/0018479 | A1 * | 1/2004 | Pritchard et al. | 434/350 |
| 2004/0202987 | A1 * | 10/2004 | Scheuring et al. | 434/118 |
| 2005/0202391 | A1 * | 9/2005 | Allen et al. | 434/362 |
| 2005/0277099 | A1 * | 12/2005 | Van Schaack et al. | 434/322 |
| 2005/0277101 | A1 * | 12/2005 | Cadman | 434/350 |
| 2006/0008781 | A1 * | 1/2006 | Townshend et al. | 434/178 |
| 2006/0099563 | A1 * | 5/2006 | Liu et al. | 434/350 |
| 2008/0098005 | A1 * | 4/2008 | Goradia | 707/10 |
| 2010/0255453 | A1 * | 10/2010 | Chincarini | 434/322 |
| 2011/0250580 | A1 * | 10/2011 | Sandeep | 434/362 |
| 2012/0123977 | A1 * | 5/2012 | Takagi et al. | 706/12 |
| 2012/0208163 | A1 * | 8/2012 | Dwyer et al. | 434/322 |
| 2012/0231438 | A1 * | 9/2012 | Fakhrai | 434/350 |

* cited by examiner

*Primary Examiner* — Jack Yip
(74) *Attorney, Agent, or Firm* — Parker Highlander PLLC

(57) ABSTRACT

An exemplary proficiency examination system includes a collaborative system allowing multiple administrators across multiple educational institutions to add questions to a bank of questions from which an administrator at a single educational institution may select for a proficiency examination. The questions may be used in a placement examination for placing students into a class of an appropriate skill level.

13 Claims, 13 Drawing Sheets

800

SLUPE TEST MA

Multiple Choice

[Main Menu] [Add MC Question] ~802

Question: La femme est _____.
Answer 1: beau
Answer 2: bel
Answer 3: joli
Answer 4: belle
Correct: belle
Semester: 1
Reference ID: 135

804~ [EDIT] [Delete Question #135] ~806

SLUPE TEST MAINTE

Adding Multiple Choice Question

Please enter your question below:
[The man _____ quite tall.] ~902
Enter possible answer #1 below:
[is] ~904a
Enter possible answer #2 below:
[are] ~904b
Enter possible answer #3 below:
[am] ~904c
Enter possible answer #4 below:
[not] ~904d
Which of the following above is the correct answer?
[is] ~904e
What course represents knowledge of this question?:
[Semester 1 ▼] ~906

[Add Question] ~908

TEST MAINTENANCE

SLUPE TEST MAINTEN

Adding Short Answer Question

Please enter your question below:
[_____ de los Estados Unidos. (I am)_____] ~1002
Enter the answer to this question below:
[soy_____] ~1004
What course represents knowledge of this question?:
[Semester 1 ▼] ~1006

[Add Question] ~1008

TEST MAINTENANCE

SLUPE TEST MAINTENANCE

Adding Multimedia Questions

Supply a link to the media file, along with 5 true/false questions.

Please enter the link to the audio/video file below: -- Upload File
[http://www.myuniversity.edu/multimedia/dialogue1.wav] ~1102
Enter true/false statement below: 1
[This conversation is between two professors.] [TRUE ▼] ~1104a
Enter true/false statement below: 2
[Thomas is interested in help with his résumé.] [FALSE ▼] ~1104b
Enter true/false statement below: 3
[Thomas wants to work for another University.] [TRUE ▼] ~1104c
Enter true/false statement below: 4
[There is a strong friendship between the two speak] [TRUE ▼] ~1104d
Enter true/false statement below: 5
[Thomas is unable to get the help he needs] [FALSE ▼] ~1104e
What course represents knowledge of this question?:
[Semester 1 ▼] ~1106

[Add Question] ~1108

TEST MAINTENANCE

```
RedBrickU question: Notre père _____ très intelligent.
Answer 1: es
Answer 2: est
Answer 3: fait
Answer 4: être
Correct: est
Semester: 1
Reference ID: 115
 TAG  ~1202
```

SLUPE TEST MA[I]

Now editing questions for: slu in the DEMO da[...]

☑ This test is ready to administer. Copy and pas[...]
http://www.phrents.net/pt/sstup_test.php?hg=[...] ~1302

Take Test ~1304

FIG. 13

COLLABORATIVE UNIVERSITY PLACEMENT EXAM

CROSS-REFERENCE TO RELATED APPLICATIONS

This application claims priority to U.S. Provisional Patent Application No. 61/376,035 filed Aug. 23, 2010, the entire contents of which is incorporated herein by reference.

BACKGROUND OF THE INVENTION

1. Field of the Invention

This invention relates to computer software and more particularly relates to software for evaluating a student's proficiency in certain skills.

2. Description of the Related Art

Current proficiency examinations systems are limited to specific applications at specific universities. Conventional examination systems include databases of questions that are asked in a linear or random fashion to a student. These conventional examination systems may be delivered to students on compact discs (CDs) or made available through a web application. The questions provided to the student during the examination are limited to a single administrator's problem sets. Thus, administrators at different educational institutions may be duplicating work of administrators at other educational institutions. Additionally, providing questions in a random or linear fashion to students may not provide the best evaluation of their proficiency in a subject area. For example, continuing to ask high difficulty questions to a student at a low skill level may consume unnecessary amounts of the student's time.

The referenced shortcomings are not intended to be exhaustive, but rather are among many that tend to impair the effectiveness of previously known techniques in proficiency examination; however, those mentioned here are sufficient to demonstrate that the methodologies appearing in the art have not been satisfactory and that a significant need exists for the techniques described and claimed in this disclosure.

SUMMARY OF THE INVENTION

From the foregoing discussion, it should be apparent that a need exists for collaborative university placement exam.

According to one aspect of the disclosure, a method includes receiving, from a first user at a first educational institution through a first user interface adapter, a first set of questions. The method also includes receiving, from a second user at a second educational institution through a second user interface adapter, a second set of questions. The method further includes combining, in a data storage, the first set of questions and the second set of questions into a global question bank. The method also includes displaying, to the first user through a first display adapter, questions from the global question bank. The method further includes receiving, from the first user through the first user interface adapter, a selection of questions from the global question bank and a difficulty for each question of the selection of questions. The method also includes generating, in the data storage, a proficiency examination from the selection of questions.

According to another aspect of the disclosure, an apparatus includes a processor and a memory coupled to the processor. The processor is configured to receive, from a first user at a first educational institution, a first set of questions. The processor is also configured to receive, from a second user at a second educational institution, a second set of questions. The processor is further configured to combine the first set of questions and the second set of questions into a global question bank. The processor is also configured to receive, from the first user, a selection of questions from the second set of questions. The processor is further configured to form a proficiency examination from the first set of questions and the selection of questions.

According to a further aspect of the disclosure, a computer program product includes a computer-readable medium having code to receive, from a first user at a first educational institution, a first set of questions. The medium also includes code to receive, from a second user at a second educational institution, a second set of questions. The medium further includes code to combine the first set of questions and the second set of questions into a global question bank. The medium also includes code to receive, from the first user, a selection of questions from the second set of questions. The medium further includes code to form a proficiency examination from the first set of questions and the selection of questions.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 8 is a form illustrating multiple choice questions for a language proficiency examination according to one embodiment.

FIG. 9 is a form illustrating adding a multiple choice question for a language proficiency examination according to one embodiment.

FIG. 10 is a form illustrating adding a short answer question to a language proficiency examination according to one embodiment.

FIG. 11 is a form illustrating adding a multimedia question to a language proficiency examination according to one embodiment.

FIG. 12 is a form illustrating tagging questions in a language proficiency examination according to one embodiment.

FIG. 13 is a form illustrating a language proficiency examination ready for completion by a student according to one embodiment.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

An exemplary proficiency examination system may include a collaborative system allowing multiple administrators across multiple educational institutions to add questions to a bank of questions from which an administrator at a single educational institution may select for a proficiency examination. According to one embodiment, the questions may be used in a placement examination for placing students into a class of an appropriate skill level. For example, a new student entering a language program at an educational institution may be tested to determine an appropriate class for the student.

The language proficiency examination may be constructed by an administrator selecting possible questions from the question bank for the exam and assigning skill levels to the possible questions. For example, each of the possible questions may correspond to a first semester language course, a second semester language course, a third semester language course, or a fourth semester language course.

After the possible questions for the language proficiency examination are selected by an administrator, a link to a web site may be provided to the administrator to provide to students to complete the examination. When a student accesses the examination through the link, the student may be asked to register with the exam and answer questions in the exam. The questions may be presented to the student in an adaptive fashion such that when a student correctly answers low difficulty questions, the examination selects higher difficulty questions for the student to complete. Questions presented to the student may be a combination of question types such as, for example, multiple choice, short answer, and multimedia questions. After a threshold number of questions for each question type are completed by the student, the examination system may determine an appropriate placement for the student in the language classes.

Figure 1:
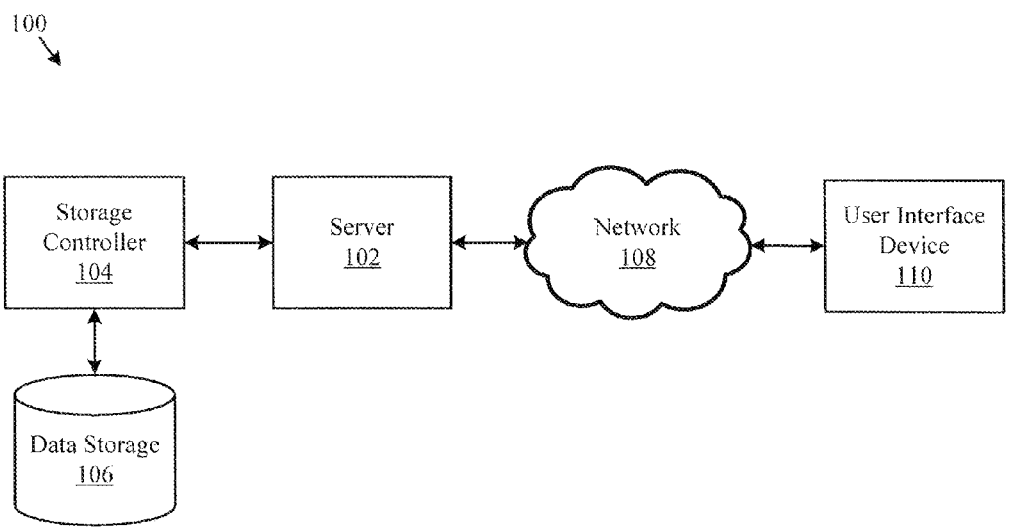
FIG. 1 is a schematic block diagram illustrating one embodiment of an exemplary system for examining student proficiency according to one embodiment.

FIG. 1 illustrates one embodiment of a system 100 for examining student proficiency. The system 100 may include a server 102, a data storage device 106, a network 108, and a user interface device 110. In a further embodiment, the system 100 may include a storage controller 104, or storage server configured to manage data communications between the data storage device 106, and the server 102 or other components in communication with the network 108. In an alternative embodiment, the storage controller 104 may be coupled to the network 108. In a general embodiment, the system 100 may evaluate student proficiency.

In one embodiment, the user interface device 110 is referred to broadly and is intended to encompass a suitable processor-based device such as a desktop computer, a laptop computer, a Personal Digital Assistant (PDA), a mobile communication device or organizer device having access to the network 108. In a further embodiment, the user interface device 110 may access the Internet to access a web application or web service hosted by the server 102 and provide a user interface for enabling a user to enter or receive information. For example, the user may enter student data, student questions, or complete examinations stored in the system 100.

The network 108 may facilitate communications of data between the server 102 and the user interface device 110. The network 108 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate, one with another.

In one embodiment, the server 102 is configured to load student questions and provide an examination for evaluating a student's proficiency. Additionally, the server may access data stored in the data storage device 106 via a Storage Area Network (SAN) connection, a LAN, a data bus, or the like.

The data storage device 106 may include a hard disk, including hard disks arranged in an Redundant Array of Independent Disks (RAID) array, a tape storage drive comprising a magnetic tape data storage device, an optical storage device, or the like. In one embodiment, the data storage device 106 may store student information and/or question banks for proficiency examinations. The data may be arranged in a database and accessible through Structured Query Language (SQL) queries, or other data base query languages or operations. For example, a database may include five tables: MCQUESTIONS, SHORTQUESTIONS, MEDIAQUESTIONS, ACCOUNT_INFO, and TEST_TAKER. A MCQUESTIONS table may include fields for Question String, Answer 1, Answer 2, Answer 3, Answer 4, Correct_Answer, Subject, Account, Level, and ID Number. A SHORTQUESTIONS table may include fields for Question String, Correct_Answer, Subject, Account, Level, and ID Number. A MEDIAQUESTIONS table may include fields for Question String, Statement 1, Statement 2, Statement 3, Statement 4, Statement 5, Statement1_answer, Statement2_answer, Statement3_answer, Statement4_answer, Statement5_answer, Subject, Account, Level, and ID Number. A ACCOUNT_INFO table may includes fields for Account_Name, Password, E_Mail, TEST_TAKER_PASSWORD, and ACCOUNT_ID. A TEST_TAKER table may include fields for FirstName, LastName, Email, Semester1_score, Semester2_score, Semester3_score, Semester4_score, listening_score, recommended_placement, and test_id_num.

Figure 2:
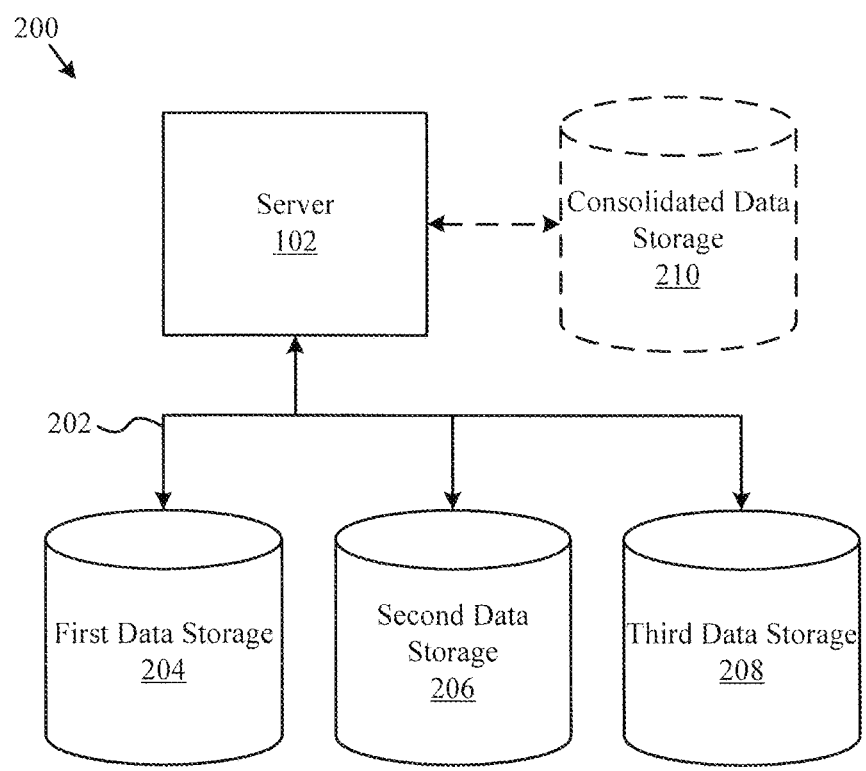
FIG. 2 is a schematic block diagram illustrating one embodiment of an exemplary database system that potentially contains redundant data in multiple databases and for storing examination and student data.

FIG. 2 illustrates one embodiment of a data management system 200 configured to evaluate student proficiency. For example, the data management system 200 may store questions, answer, scores, and/or student information. In one embodiment, the data management system 200 may include a server 102. The server 102 may be coupled to a data-bus 202. In one embodiment, the data management system 200 may also include a first data storage device 204, a second data storage device 206, and/or a third data storage device 208. In further embodiments, the data management system 200 may include additional data storage devices (not shown). In such an embodiment, each data storage device 204, 206, 208 may each host a separate database that may, in conjunction with the other databases, contain redundant data. Alternatively, the storage devices 204, 206, 208 may be arranged in a RAID configuration for storing a database or databases through may contain redundant data.

In one embodiment, the server 102 may submit a query to selected data storage devices 204, 206 to collect a consolidated set of data elements associated with an individual or group of individuals. The server 102 may store the consolidated data set in a consolidated data storage device 210. In such an embodiment, the server 102 may refer back to the consolidated data storage device 210 to obtain a set of data elements associated with a specified individual. Alternatively, the server 102 may query each of the data storage devices 204, 206, 208 independently or in a distributed query to obtain the set of data elements associated with a specified individual. In another alternative embodiment, multiple databases may be stored on a single consolidated data storage device 210.

The data management system 200 may also include files for administering proficiency examinations and tracking examination results. For example, the data management system may store hypertext markup language (HTML) files, hypertext preprocessing (PHP) files, cascaded style sheet (CSS) files, javascript (JS) files, and flash (FLV) files.

In various embodiments, the server 102 may communicate with the data storage devices 204, 206, 208 over the data-bus 202. The data-bus 202 may comprise a SAN, a LAN, or the like. The communication infrastructure may include Ethernet, Fibre-Channel Arbitrated Loop (FC-AL), Small Computer System Interface (SCSI), Serial Advanced Technology Attachment (SATA), Advanced Technology Attachment (ATA), and/or other similar data communication schemes associated with data storage and communication. For example, the server 102 may communicate indirectly with the data storage devices 204, 206, 208, 210; the server 102 first communicating with a storage server or the storage controller 104.

In one example of the data management system 200, the first data storage device 204 may store data associated with questions and/or answers relating to a course for one course offered at one educational institution. In one embodiment, the second data storage device 206 may store questions and/or answers relating to a course offered at a second educational institution. The third data storage device 208 may store student data such as previous exams taken, evaluated proficiencies, and student profile information.

The server 102 may host a software application configured for evaluating student proficiency. The software application may further include modules for interfacing with the data storage devices 204, 206, 208, 210, interfacing a network 108, interfacing with a user through the user interface device 110, and the like. In a further embodiment, the server 102 may host an engine, application plug-in, or application programming interface (API). In another embodiment, the server 102 may host a web service or web accessible software application such as a Web 2.0 application.

Figure 3:
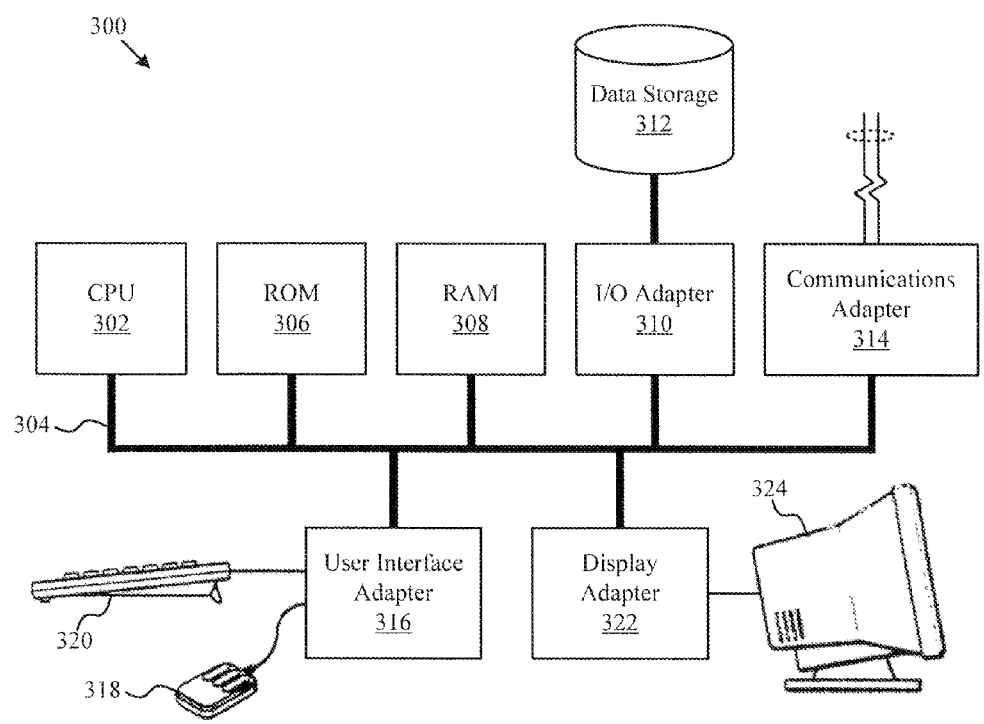
FIG. 3 is a schematic block diagram illustrating one embodiment of an exemplary computer system that may be used in accordance with certain embodiments of the system for examining student proficiency.

FIG. 3 illustrates a computer system 300 adapted according to certain embodiments of the server 102 and/or the user interface device 110. The central processing unit (CPU) 302 is coupled to the system bus 304. The CPU 302 may be a general purpose CPU or microprocessor. The present embodiments are not restricted by the architecture of the CPU 302, so long as the CPU 302 supports the modules and operations as described herein. The CPU 302 may execute the various logical instructions according to the present embodiments.

The computer system 300 also may include random access memory (RAM) 308, which may be SRAM, DRAM, SDRAM, or the like. The computer system 300 may utilize RAM 308 to store the various data structures used by a software application configured to identifying system redundancy and consolidation opportunities. The computer system 300 may also include read only memory (ROM) 306 which may be PROM, EPROM, EEPROM, optical storage, or the like. The ROM may store configuration information for booting the computer system 300. The RAM 308 and the ROM 306 hold user and system data.

The computer system 300 may also include an input/output (I/O) adapter 310, a communications adapter 314, a user interface adapter 316, and a display adapter 322. The I/O adapter 310 and/or the user interface adapter 316 may, in certain embodiments, enable a user to interact with the computer system 300 in order to input information for obtaining student questions, student information, and/or student answers. In a further embodiment, the display adapter 322 may display a graphical user interface associated with a software or web-based application for evaluating student proficiency.

The I/O adapter 310 may connect one or more storage devices 312, such as one or more of a hard drive, a Compact Disk (CD) drive, a floppy disk drive, a tape drive, to the computer system 300. The communications adapter 314 may be adapted to couple the computer system 300 to the network 108, which may be one or more of a LAN, WAN, and/or the Internet. The user interface adapter 316 couples user input devices, such as a keyboard 320, a pointing device 318, a microphone (not shown), and a video camera (not shown) to the computer system 300. The display adapter 322 may be driven by the CPU 302 to control the display on the display device 324. The display device 324 may be, for example, a monitor, television, projector, or a display on a mobile device such as a cellular phone.

The present embodiments are not limited to the architecture of computer system 300. Rather the computer system 300 is provided as an example of one type of computing device that may be adapted to perform the functions of a server 102 and/or the user interface device 110. For example, any suitable processor-based device may be utilized including without limitation, including personal data assistants (PDAs), computer game consoles, and multi-processor servers. Moreover, the present embodiments may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
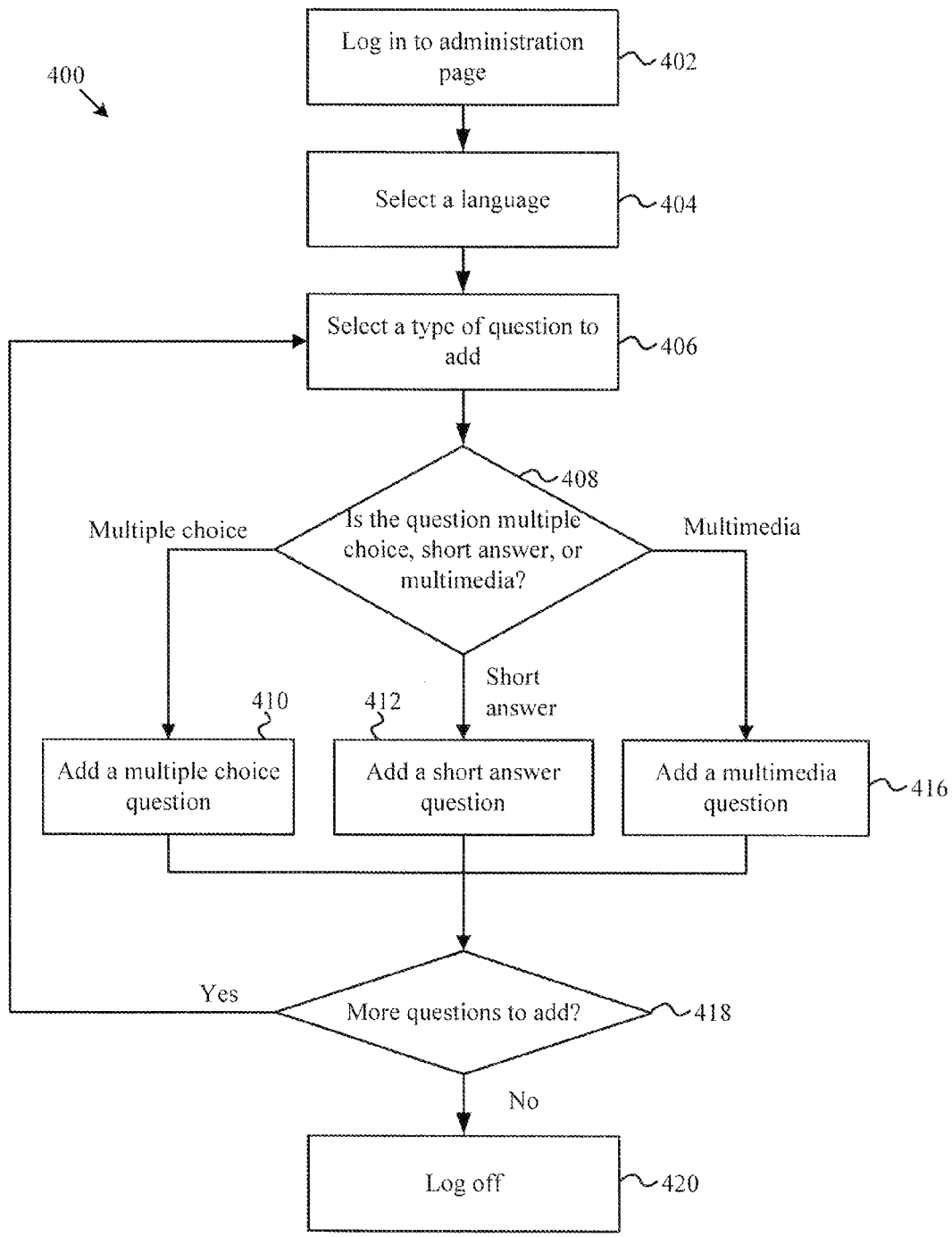
FIG. 4 is a flow chart illustrating one embodiment of a method for administering language proficiency examination.
Figure 5:
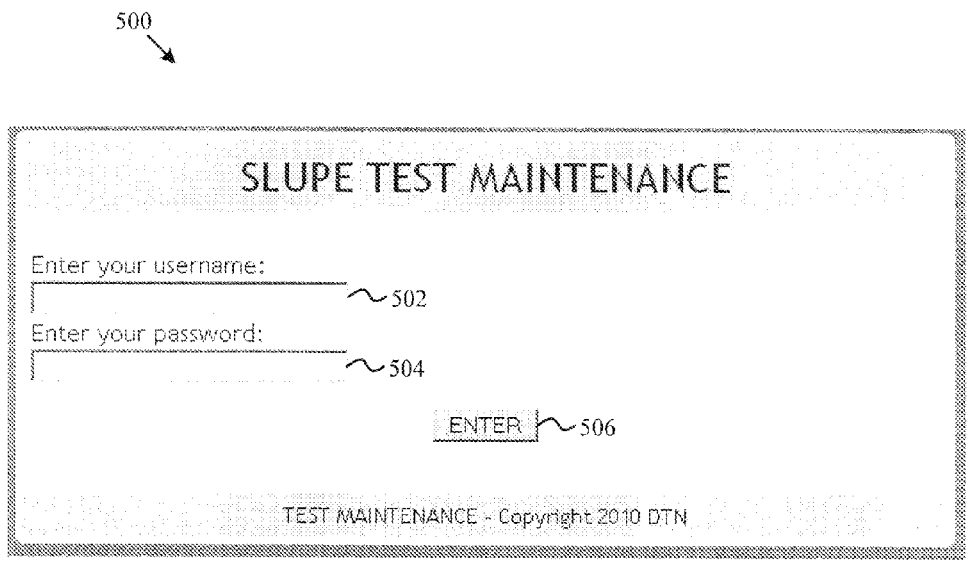
FIG. 5 is a form illustrating logging in to the administration page according to one embodiment.

FIG. 4 is a flow chart illustrating one embodiment of a method 400 for administering language proficiency examination. In one embodiment, the method 400 starts with logging in to an administration page of the language proficiency examination software at block 402. FIG. 5 is a form illustrating logging in to the administration page according to one embodiment. A form 500 may include a username input 502, a password input 504, and a submit button 506. A user may enter their username and password into the inputs 502, 504, respectively and press the button 506 to begin logging on. If the log-on information is incorrect, a screen displaying an error may be presented to the user along with or without an option to recover the password.

Figure 6:
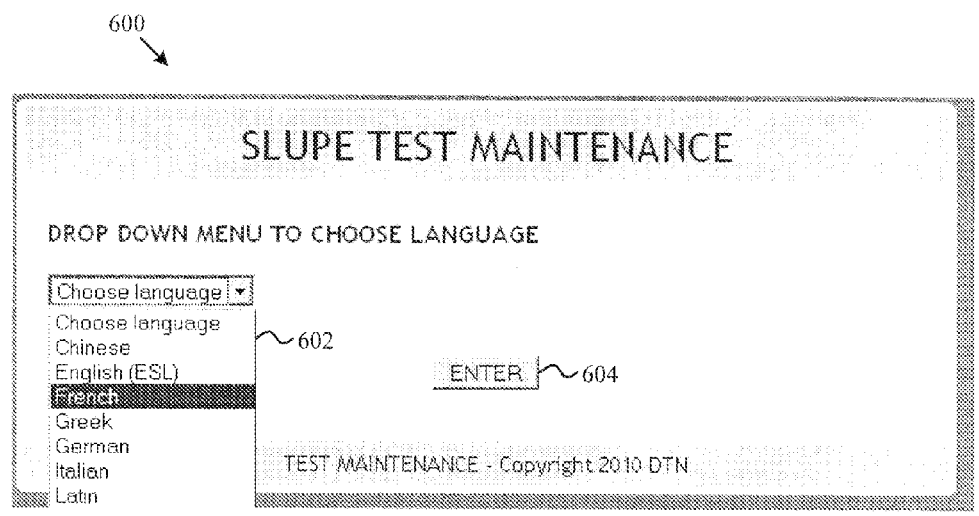
FIG. 6 is a form illustrating selection of a language according to one embodiment.

After a user is logged in to the administration page, the method 400 continues to block 404 for a user to select a language. FIG. 6 is a form illustrating selection of a language according to one embodiment. A form 600 may include an input 602, such as a drop-down box, for selecting a language, and a submit button 604. A user may select a language from the input 602 and press the button 604. Although languages are shown in the input 602, the input 602 may provide other options for an administrator. According to one embodiment, the input 602 may include different subjects such as mathematics, reading, writing, language, and/or history.

Figure 7:
FIG. 7 is a form illustrating a menu screen for a language proficiency examination according to one embodiment.

Next, at block 406 an administrator selects a type of question to add, edit, or delete to the language proficiency examination selected at block 404. FIG. 7 is a form illustrating a menu screen for a language proficiency examination according to one embodiment. A form 700 may include an edit option 702 for multiple choice questions, an edit option 704 for short answer questions, and an edit option 706 for multimedia questions. Although only three types of questions are illustrated in the form 700, additional question types may be present in the form 700. For example, other question types may include true/false questions, speech response questions, and calculated numerical response questions. Selecting one of the edit options 702, 704, and 706 allows the use to add, edit, and/or delete questions of the corresponding question type.

After an administrator selects one of the question types, the method 400 proceeds to block 408 to determine the type of question the administrator selected for editing. If the multiple choice question type is selected, the method 400 proceeds to allow the administrator to add, edit, and/or delete multiple choice questions at block 410.

FIG. 8 is a form illustrating multiple choice questions for a language proficiency examination according to one embodiment. The form 800 may include a button 802 for adding multiple choice questions, a button 804 for editing a multiple choice question, and a button 806 for deleting a multiple choice question. According to one embodiment, multiple choice questions may be displayed on the form 800 and the buttons 804, 806 displayed next to each multiple choice question in the selected language proficiency examination. When an administrator selects the button 802 to add a multiple choice question a form is displayed to accept input from the administrator.

FIG. 9 is a form illustrating adding a multiple choice question for a language proficiency examination according to one embodiment. The form 900 may include question input 902, answer inputs 904a, 904b, 904c, 904d, and 904e, skill level input 906, and a submit button 908. An administrator inputs the multiple choice question into the input 902. According to one embodiment, the question in input 902 may include hypertext markup language (HTML) tags for formatting the text such as <b></b> for bold and <i></i> for italics. The administrator also inputs the possible answers to the multiple choice question in the inputs 904a-e. Although five possible answers are illustrated, different numbers of possible answers are possible. For example, there may be four or six possible answers. Additionally, the number of possible answers may be selected by an administrator when adding a new multiple choice question. That is, different multiple choice questions of the language proficiency examination may have different numbers of possible answers. The administrator also inputs the skill level into the input 906. The skill level indicates, for example, the semester a student correctly answering the multiple choice questions is qualified to enter. The input 906 may include options such as, for example, Semester 1, Semester 2, Semester 3, and Semester 4. After the administrator inputs data to the inputs 902, 904a-e, and 906, the administrator may submit the multiple question by pressing the button 908.

According to one embodiment, when an administrator is entering questions and answers in the inputs 902 and 904a-e a virtual keyboard may appear on the administrator's screen. The virtual keyboard allows an administrator with a computer system operating in one language to enter examination questions in a different language. For example, in a language proficiency examination an administrator may be entering questions in the Spanish language with an English language keyboard. The virtual keyboard may include accented vowels present in the Spanish language but not present on the English language keyboard. Alternatively, the virtual keyboard may display an entire virtual Spanish language keyboard allowing the administrator to enter text with, for example, a mouse, trackpad, trackball, stylus, or other input device. According to one embodiment, the proficiency examination system is UTF-8 compliant to support language input in any language including Chinese and Arabic.

Referring back to FIG. 4, if the question type determined at block 408 is short answer then the method 400 proceeds to allow the administrator to add, edit, and/or delete short answer questions at block 412. FIG. 10 is a form illustrating adding a short answer question to a language proficiency examination according to one embodiment. A form 1000 may include a question input 1002, an answer input 1004, a skill level input 1006, and a submit button 1008. An administrator may enter a short answer question into the input 1002, an answer into the input 1004, and select a skill level in the input 1006. After filling the inputs 1002, 1004, 1006 the administrator presses the button 1008, and the short answer question entered into the form 1000 is added to the database.

Referring back to FIG. 4, if the question type determined at block 408 is multimedia then the method 400 proceeds to allow the user to add, edit, and/or delete multimedia questions at block 416. FIG. 11 is a form illustrating adding a multimedia question to a language proficiency examination according to one embodiment. A form 1100 may include a link input 1102 for entering a link to the multimedia file. The multimedia file may be, for example, an audio or video file for display to a user along with questions about the content of the multimedia file. According to one embodiment, the multimedia file is uploaded to the server and stored on the server. Alternatively, the link to the multimedia file may be stored on the server. When the multimedia file is uploaded to the server, the server may restrict the types or sizes of allowable multimedia files. For example, the server may limit multimedia files to mpeg-1 layer 3 (MP3) audio files with a file size smaller than one megabyte (MB). The administrator then enters questions and answers into inputs 1104a-e. According to one embodiment, the inputs 1104a-e may be true or false questions related to the content contained in the multimedia file. After the administrator selects a skill level in an input 1106, the administrator presses a submit button 1108 to add the question to the database.

According to one embodiment, a multimedia question may include a multimedia response. For example, a terminal or computer in use by the student during administration of the proficiency examination may include a microphone and/or video camera. After reading a prompt or question, a recording may start to record the student's speech or motion. For example, a student may be prompted to describe an object in Spanish as a recording during the proficiency examination. In another example, a student may be prompted to describe an object in sign language to the video camera during the proficiency examination.

Referring back to FIG. 4, the method 400 continues to block 418 to determine if the administrator will add, edit, or delete additional questions from the database. If the administrator will add, edit, or delete more questions, then the method 400 proceeds to block 406. If the administrator has completed administering the questions database then the administrator may log off at block 420.

Collaboration between educational institutions allows an administrator to enter questions from a first educational institution onto a proficiency examination at a second educational institution. That is, the educational institutions may share questions and answers for the proficiency tests. When an administrator adds a question to their educational institution's proficiency examination, the question may have a different skill level. For example, if a first educational institution has a two semester per school year calendar and a second educational institution has a three semester per school year calendar, semester 1 questions at the first educational institution may correspond to semester 2 questions at the second educational institution. Thus, when an administrator adds a question to their proficiency examination from another educational institution, the administrator may tag the question with a skill level. According to one embodiment, search functionality is provided for an administrator to search for questions relating to a specific topic or keyword in other educational institutions' questions.

FIG. 12 is a form illustrating tagging questions in a language proficiency examination according to one embodiment. A form 1200 may display a question from another educational institution along with a tag button 1202. An administrator may be shown a list of available questions from another educational institution with a tag button 1202 corresponding to each available question. If an administrator selects the tag button 1202 for an available question, the administrator is prompted with a skill level input. After the administrator selects a skill level for the question, the question is added to the administrator's proficiency examination.

Allowing questions to be shared across educational institutions decreases the time for a new educational institution to complete setting up proficiency examinations. Additionally, the current educational institutions gain insight from administrators across multiple educational institutions, which improves the accuracy of each educational institutions examination.

The collaboration may also allow testing for a proficiency at a first educational institution for a second educational institution. For example, a first educational institution may offer Spanish language classes, but a prospective student of the first educational institution may be unable to travel to the first educational institution for proficiency testing. The student may instead travel to a nearby second educational institution for completing the Spanish language proficiency examination, despite the second education institution only offering French language classes.

After an administrator has added questions to the proficiency examination, the system may determine the proficiency examination is ready to administer. The system may use a number of criteria to determine when an examination is ready to administer. For example, a proficiency examination may have a minimum of 20 multiple choice, 15 short answer, and 5 multimedia questions before the examination is ready to administer. According to one embodiment, the system is configurable by the administrator or other official to have minimum question number thresholds before an examination is ready for administration.

After the proficiency examination is ready for examination the administrator is presented with notification and a link to distribute the examination to students. FIG. 13 is a form illustrating a language proficiency examination ready for completion by a student according to one embodiment. A form 1300 may include a notification and link 1302. The link 1302 may be, for example, distributed to exam proctors in a classroom or emailed to students. Additionally, a link 1304 is provided to the administrator for taking the examination. This may allow the administrator to test the examination before distribution to students.

When students complete the proficiency examination scores are recorded in the system. According to one embodiment, the scores and a record of the questions attempted and student answers to the questions are recorded. According to another embodiment, no scores are recorded in the system after the student receives their score for the proficiency examination. If scores are stored, the scores may be searchable by an administrator.

Figure 14:
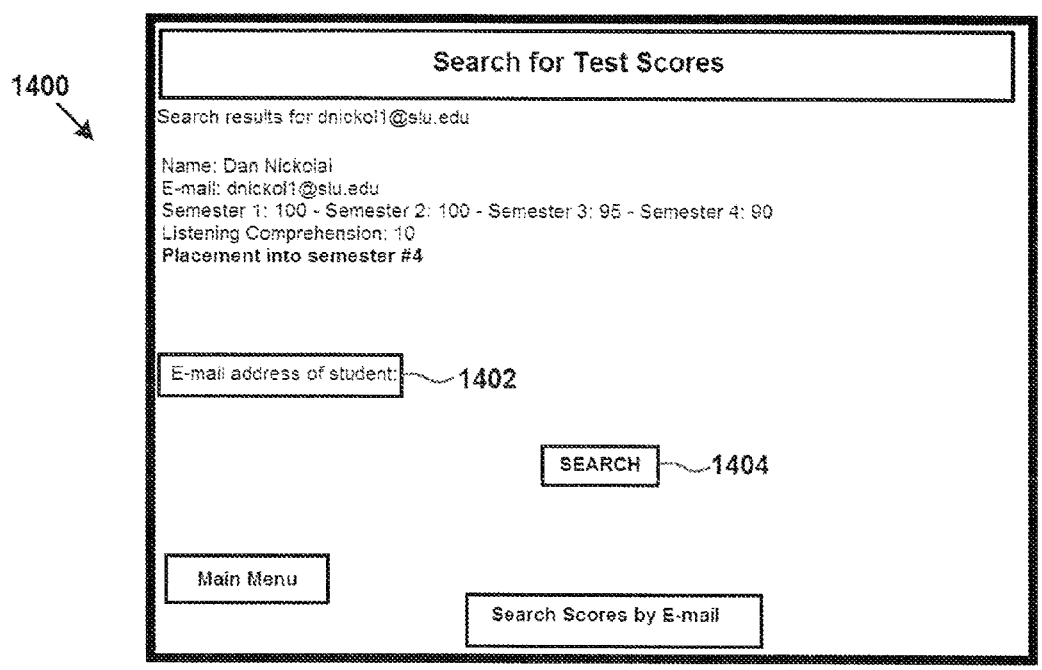
FIG. 14 is a form illustrating searching for test scores from a language proficiency examination according to one embodiment.

FIG. 14 is a form illustrating searching for test scores from a language proficiency examination according to one embodiment. A form 1400 may include a search input 1402 and a submit button 1404. An administrator may enter search criteria into the input 1402 and press the button 1404 to search for scores. According to one embodiment, scores may be stored with a student's email address. According to other embodiments, scores may be stored with an student's id number, name, username, and/or an arbitrary identification number.

After the score is displayed to an administrator a decision may be made for placement according to the student's proficiency. For example, in a language proficiency examination, a student's score may be separated according to the percentage of questions correctly answered for each skill level or semester of class. If the student has exceeded a desired percentage of correct answers the student is determined to be placed in the corresponding semester of class. For example, if a student has scored a 100% proficiency in semester 1 questions, a 100% proficiency in semester 2 questions, a 95% proficiency in semester 3 questions, and a 90% proficiency in semester 4 questions the student may be placed in the semester 4 language class. According to one embodiment, the system may be designed to automatically determine a student's placement based on results of the proficiency examination.

The system may generate a proficiency examination from the questions entered or selected from other educational institutions by the administrator. According to one embodiment, the proficiency examination generated for each student is adaptive to the student's answers in the proficiency examination. For example, as a student answers low skill level questions correctly, the student is presented with questions from higher skill levels. If the higher skill level questions are incorrectly answered, the student may be presented with lower skill level questions.

Figure 15:
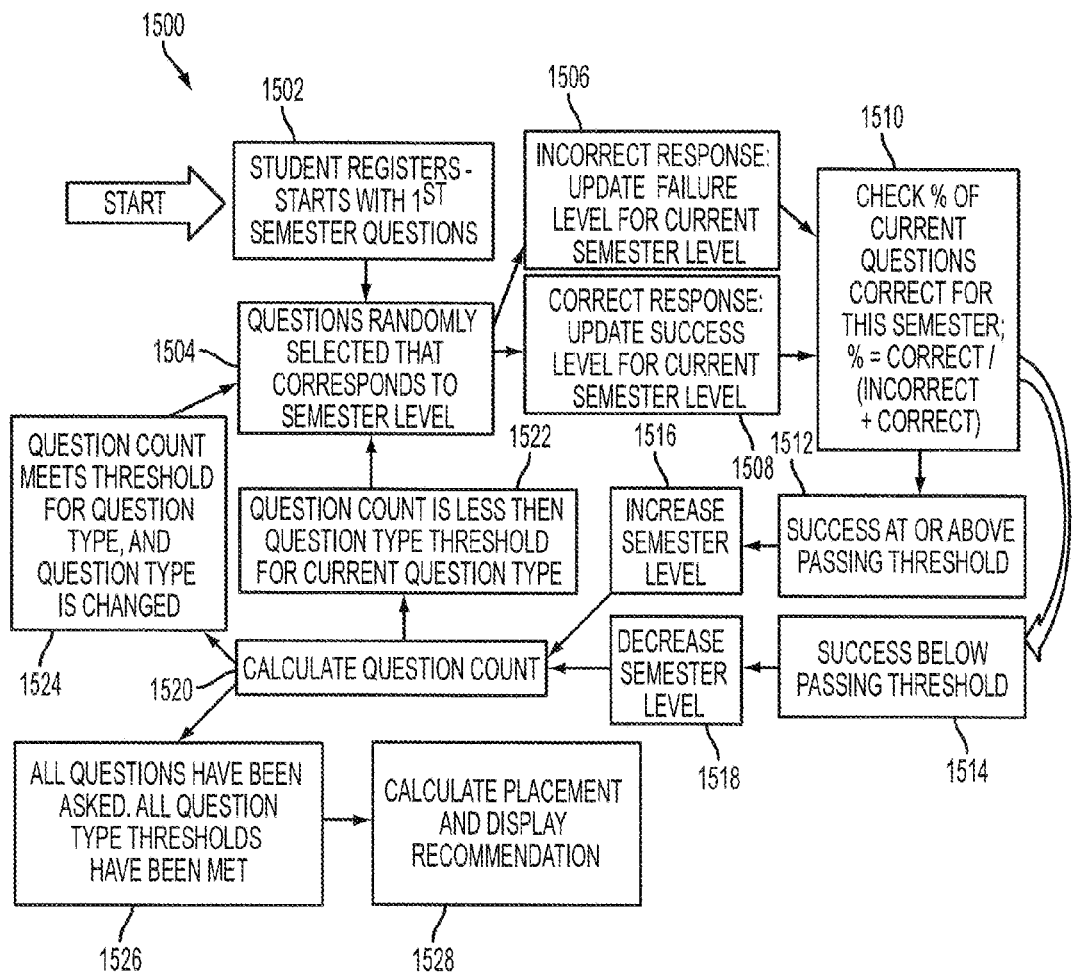
FIG. 15 is a flow chart illustrating an adaptive examination process for a language proficiency examination according to one embodiment.

FIG. 15 is a flow chart illustrating an adaptive examination process for a language proficiency examination according to one embodiment. A flow chart 1500 illustrates an adaptive examination. At block 1502 a student registers for a proficiency examination and the current semester level is set at the first semester level. At block 1504 a random question is selected from current semester level questions and presented to the student. If a student correctly answers the question, at block 1508 the correct response is noted and the success level for the current semester level is updated. If the student incorrectly answers the question, at block 1506 the incorrect response is noted and the failure level for the current semester level is updated.

At block 1510 the percentage of correct answers for the current semester level is calculated. If the percentage is at or above a passing threshold the flow chart 1500 continues to block 1512 and block 1516 to increase the semester level. If the percentage is below a passing threshold the flow chart 1500 continues to block 1514 and block 1518 to decrease the semester level.

At block 1520 the number of questions presented to the student is calculated. If the question count is less than the question type threshold the flow chart 1500 continues to block 1522 and to block 1504 to randomly select another question for the student from the new current semester level. If the question count is at or above the question type threshold the flow chart 1500 continues to block 1522 and 1504 to change the question type and randomly select another question for the student at the current semester level. If all questions have been asked or all question type thresholds have been met or exceeded the flow chart 1500 continues to block 1526 and block 1528 to calculate and display a placement recommendation for the student.

Figure 16:
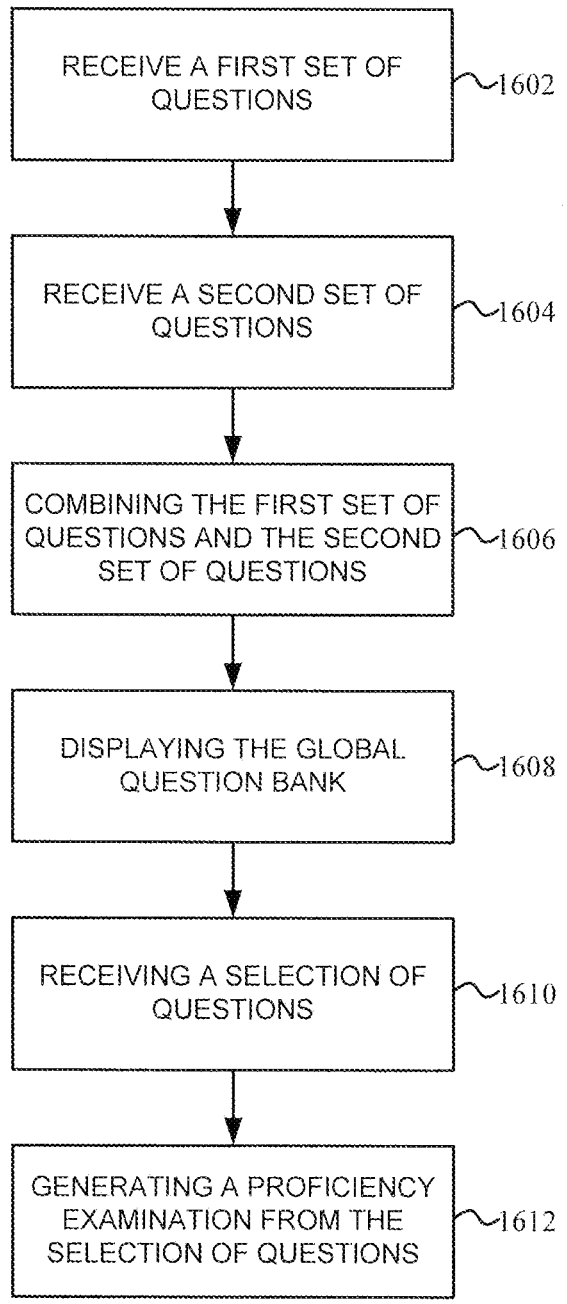
FIG. 16 is a flow chart illustrating a method for generating a proficiency examination according to one embodiment.

FIG. 16 is a flow chart illustrating a method for generating a proficiency examination according to one embodiment. At block 1602 a first set of questions is received. At block 1604 a second set of questions is received. At block 1606 the first set of questions is combined with the second set of questions to form a global question bank. At block 1608 the global question bank is displayed. At block 1610 a selection of questions from the global question bank is received. At block 1612 a proficiency examination is generated from the selection of questions.

In one embodiment, the method may further include steps for validating test questions by performing a question efficacy analysis. For example, question efficacy analysis may be performed on test question data collected for each test question or groups of test questions. The test question data may be collected from a database of exam question responses provided by users of the exam. In a further embodiment, a report indicating which questions are good predictors of semester placement and which questions are poor predictors of semester placement may be generated from the test question data.

In such an embodiment, the question efficacy analysis may enable test administrators to identify problematic questions and then either remove or reword the problematic questions. In one example, a test question may be too difficult for the semester placement level to which it is assigned. In such an example, the problematic question may be identified based upon a relatively high number of students answering the question incorrectly. The report generated may provide an indicator, such as, "ineffective" or "this question has no correlation to placement at this level; consider rewording or reclassifying the question."

Figure 17:
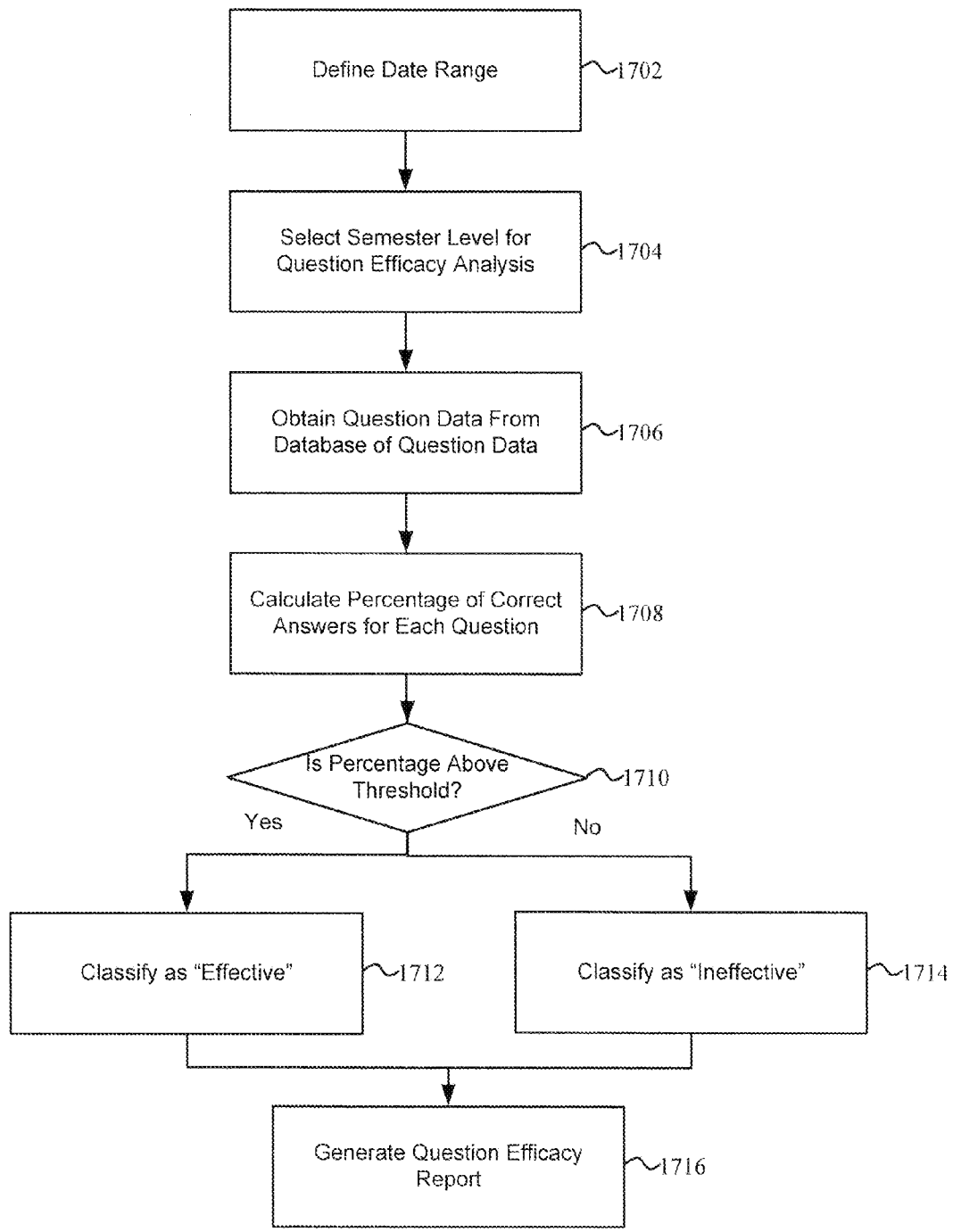
FIG. 17 is a flow chart illustrating a method for performing question efficacy analysis.

In a particular embodiment, the method of question efficacy analysis may include the steps shown in FIG. 17. In one embodiment, the CPU 302 may define 1702 a date range for efficacy analysis. In a particular embodiment the processor may define 1702 the date range in response to a user input received by the user interface adapter 316. Next, the CPU 302 may select 1704 the semester level for question efficacy analysis. Similarly, the CPU 302 may select 1704 the semester level in response to a user input received by the user interface adapter 316. Next, the I/O adapter 310 may obtain 1706 question data from a database of question data. The database of question data may be stored, for example, on the data storage device 312. In an alternative embodiment, the communications adapter 314 may obtain 1706 the question data from a database of question data stored on a remote data storage device as illustrated according to the system 200 of FIG. 2.

In one embodiment, the CPU 302 may then calculate 1708 the percentage of correct answer questions for each question ID in the selected range of IDs in the database. The CPU 302 may then determine 1710 whether the percentage is above a threshold value. In one embodiment, the threshold value is a preset default value. Alternatively, the threshold value may be received by the user interface from a user. If the percentage is above the threshold then the CPU 302 may classify 1712 the question as "effective." If the percentage is below the threshold, the CPU 302 may classify 1714 the question as "ineffective." Finally, the CPU 302 may generate 1716 a question efficacy report based upon the question classifications 1712, 1714.

In one embodiment, the report may include information for one or more analyzed questions. The report may include the question identification number. The report may also include a semester level classification. Additionally, the report may include the percentage of students enrolled above the semester level classification that successfully answered the question. Additionally, the report may include a recommendation, such as "question being answered as expected" or "revisit question or reassign to a higher semester level." One of ordinary skill in the art may recognize a variety of alternative criteria that may be suitable for question efficacy analysis and a variety of alternative report output formats and contents.

One of ordinary skill in the art will recognize that the various process steps of the methods described above may be performed, in whole or in part, by one or more hardware components, including but not limited to, the server 102 and/or an associated CPU 302. Further, one of ordinary skill in the art will recognize that the various hardware components described herein may be configured to perform the described operations using computer executable code. For example, the computer operations may be defined in one or more software modules, which may be stored on a tangible computer readable medium. Then the code is loaded and executed by a hardware component, such as the CPU 302, the hardware component may be configured as a hardware module suitable for carrying out the operations specified by the computer executable code. Thus, each of the method steps described herein may be carried out by one or more specially configured hardware and/or software modules programmed according to computer readable code stored on a tangible computer program product, such as a data storage disk or chip.

Although the above embodiments and examples illustrate a language proficiency examination, the system of the present disclose is not limited to determining a student's language proficiency. The proficiency examination system may also test student's skills in other subjects such as reading, writing, mathematics, science, and history. Additionally, the proficiency examination system is not limited to university environments but may be applied to other educational arrangements. For example, a corporation may use the proficiency examination system for employer-based testing in safety courses or company policies.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. A method, comprising:
   receiving, from a first user at a first educational institution through a first user electronic interface adapter, a first set of questions;
   receiving, from a second user at a second educational institution through a second user electronic interface adapter, a second set of questions;
   combining, in a data storage, the first set of questions and the second set of questions into a global question bank;
   displaying, to the first user through a first display adapter, questions from the global question bank;
   receiving, from the first user through the first user electronic interface adapter, a selection of questions from the global question bank and a difficulty for each question of the selection of questions;
   generating, in the data storage, a proficiency examination from the selection of questions;
   displaying, to a student through a second display adapter, a first random question of a first question type from the proficiency examination;
   receiving, from the student through a third user electronic interface adapter, a first answer corresponding to the first random question;
   determining, in a processor, if the first answer is a correct answer for the first random question;
      if the first answer is the correct answer, increasing a current difficulty;
      if the first answer is not the correct answer, decreasing the current difficulty; and
   calculating, in the processor, a number of questions displayed to the student of the first question type;
      if the number of first question types displayed exceeds a first question type threshold then displaying, to the student through the second display adapter, a second random question of a second question type at the current difficulty; and
      if the number of first question types displayed does not exceed the first question type threshold then displaying, to the student through the second display adapter, a second random question of the first question type at the current difficulty.

2. The method of claim 1, further comprising:
   calculating, in the processor, numerical scores for questions answered correctly by the student at each difficulty; and
   determining, and storing in the data storage, a placement for the student based, in part, on the numerical scores.

3. The method of claim 2, in which calculating the numerical scores comprises calculating a percentage of questions answered correctly.

4. The method of claim 2, further comprising determining, in the processor, at least one question type threshold is exceeded before determining the student placement.

5. The method of claim 1, in which receiving, from the student, the first answer comprises recording, through the third user electronic interface adapter, at least one of audio and video of the student.

6. The method of claim 1, further comprising displaying, through the second display adapter, a virtual keyboard to the first user before receiving the first set of questions.

7. The method of claim 1, in which receiving a first set of questions comprises receiving one of a multiple choice question, a short answer question, a multimedia question, a true/false question, and a calculated numerical answer question.

8. The method of claim 1, in which generating a proficiency examination comprises generating a language proficiency examination.

9. An apparatus, comprising:
   at least one processor;
   a non-transitory computer readable medium having instructions stored thereon coupled to the at least one processor,
   wherein the at least one processor executes the instructions to perform the following steps:
   to receive, from a first user through a first user electronic interface adapter at a first educational institution, a first set of questions and a difficulty and a type for each question of the first set of questions;
   to receive, from a second user through a second user electronic interface adapter at a second educational institution, a second set of questions and a difficulty and a type for each question of the second set of questions;

to combine the first set of questions and the second set of questions into a global question bank;

to receive, from the first user, a selection of questions from the second set of questions;

to form a proficiency examination from the first set of questions and the selection of questions;

to display through a first display adapter, to a student, a first random question of a first question type from the proficiency examination;

to receive, from the student, a first answer corresponding to the first random question;

to determine if the first answer is a correct answer for the first random question;

to increase a current difficulty if the first answer is the correct answer;

to decrease the current difficulty if the first answer is not the correct answer; and to calculate a number of questions displayed to the student of the first question type;

to display to the student through the first display adapter, a second random question of the first question type at the current difficulty if the number of first question types displayed does not exceed the first question type threshold; and to display to the student through the first display adapter, a third random question of a second question type at the current difficulty if the number of first question types displayed does not exceed the first question type threshold.

10. The apparatus of claim 9, in which the at least one processor is further configured:

to calculate numerical scores for questions answered correctly by the student at each difficulty; and to determine a placement for the student based, in part, on the numerical scores.

11. A computer program product, comprising:

a non-transitory computer-readable medium having instructions stored thereon executable by at least one processor, comprising:

code to receive, from a first user through a first user electronic interface adapter at a first educational institution, a first set of questions and a difficulty and a type for each question of the first set of questions;

code to receive, from a second user through a second user electronic interface adapter at a second educational institution, a second set of questions and a difficulty and a type for each question of the second set of questions;

code to combine the first set of questions and the second set of questions into a global question bank;

code to receive, from the first user, a selection of questions from the second set of questions;

code to form a proficiency examination from the first set of questions and the selection of questions;

code to display through a first display adapter, to a student, a first random question of a first question type from the proficiency examination; and code to receive, from the student, a first answer corresponding to the first random question;

code to determine if the first answer is a correct answer for the first random question;

code to increasing a current difficulty if the first answer is the correct answer;

code to decrease the current difficulty if the first answer is not the correct answer;

code to display, to a student, a second random question at the current difficulty;

code to calculate a number of questions displayed to the student of the first question type;

code to display to the student through the first display adapter, a second random question of the first question type at the current difficulty if the number of first question types displayed does not exceed the first question type threshold; and code to display to the student through the first display adapter, a third random question of a second question type at the current difficulty if the number of first question types displayed does not exceed the first question type threshold.

12. The computer program product of claim 11, in which the medium further comprises:

code to calculate numerical scores for questions answered correctly by the student at each difficulty; and code to determine a placement for the student based, in part, on the numerical scores.

13. The computer program product of claim 11, in which the code to form a proficiency examination forms a language proficiency examination.

\* \* \* \* \*